Patented Apr. 20, 1926.

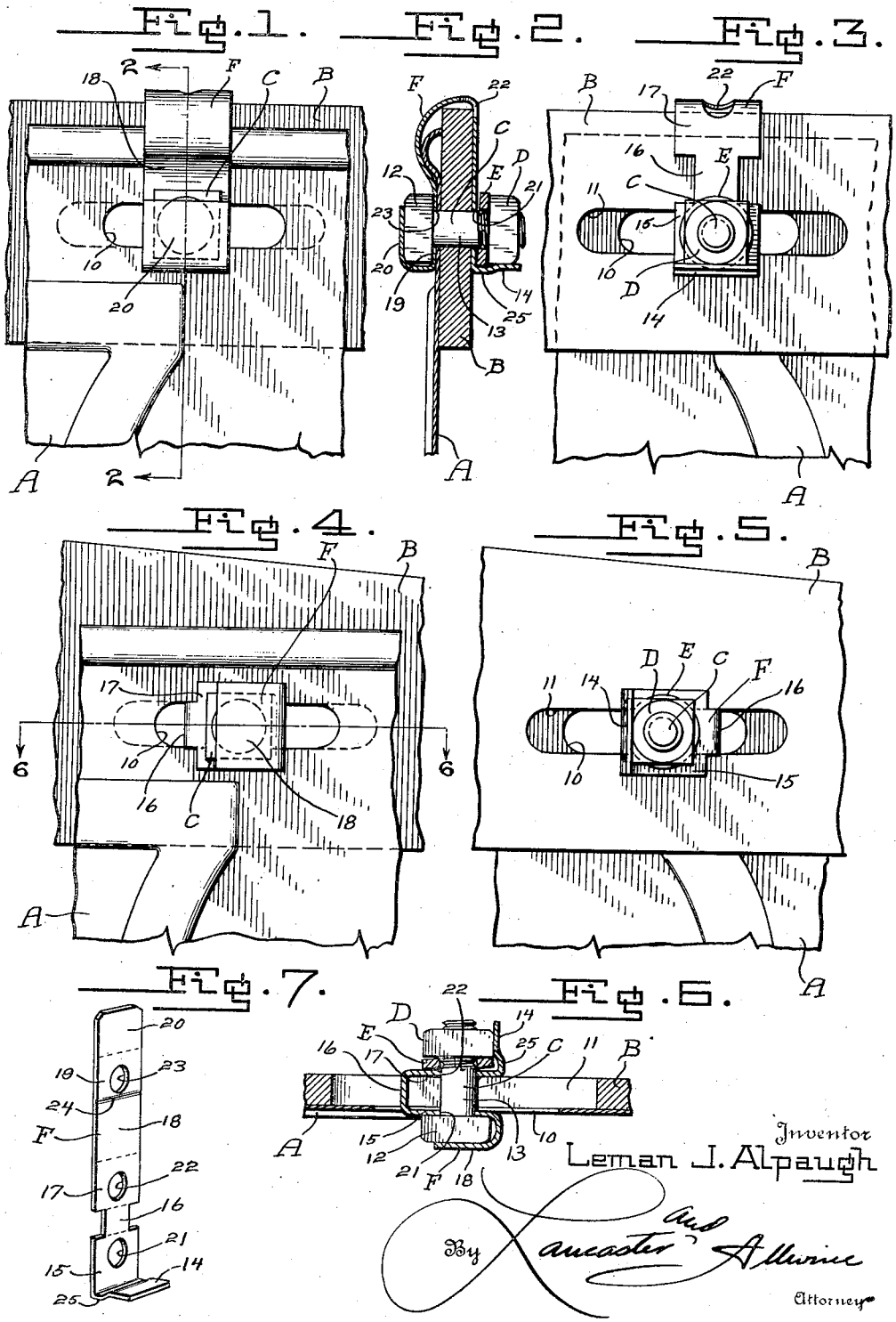

1,581,416

UNITED STATES PATENT OFFICE.

LEMAN J. ALPAUGH, OF FENTON, MICHIGAN.

LICENSE-PLATE CLIP.

Application filed January 12, 1925. Serial No. 1,994.

*To all whom it may concern:*

Be it known that I, LEMAN J. ALPAUGH, a citizen of the United States, residing at Fenton, in the county of Genesee and State of Michigan, have invented certain new and useful Improvements in a License-Plate Clip, of which the following is a specification.

The present invention relates to locking means for bolts and nuts, and more particularly to an improved clip especially well adapted for use in securely retaining license plates upon motor vehicles or the like.

The primary object of the invention being to provide a license plate clip so constructed as to firmly engage both the head of the bolt and the nut threaded on the bolt, in a manner as to prevent rotation of one with respect to the other.

A further object of the invention is to provide a clip of this character which may be readily associated with license plate brackets of various types.

A further object of the invention is to provide a license plate locking clip which may be used in connection with standard bolts and nuts, without alteration or mutilation thereof; and which clip is of such construction as to permit of the use of a lock washer for preventing rattling of the parts due to vibration.

A still further object of the invention is to provide an extremely simple, yet efficient license plate clip, which may be readily stamped from strips of sheet metal, hence making the device inexpensive to manufacture.

Other objects and advantages of the invention will be apparent during the course of the following detailed description, taken in connection with accompanying drawing, forming a part of this specification, and in which drawing, Figure 1 is a fragmentary face plan view showing one manner of employing the improved locking clip in connection with the usual retaining bolt of a license plate.

Figure 2 is a vertical section on line 2—2 of Figure 1, looking in the direction of the arrows.

Figure 3 is a fragmentary rear plan view of the structure shown in Figure 1.

Figure 4 is a fragmentary face plan view showing a different manner of employing the locking clip for preventing relative movement of the nut and bolt.

Figure 5 is a fragmentary rear plan view of the structure shown in Figure 4.

Figure 6 is a horizontal section on line 6—6 of Figure 4, looking in the direction of the arrows, and Figure 7 is a perspective view of one of the improved clips in the condition prior to its application to a bolt.

Referring to the drawing in detail, and wherein similar characters designate corresponding parts throughout the views, A designates a license plate, and B a supporting bracket therefor; C a bolt; D a nut for threaded connection with the bolt C; E a lock washer; and F a locking device for preventing relative movement of the nut D with respect to the bolt C.

The license plate A which is of usual construction, is provided adjacent its upper marginal edge with an elongated slot 10 which is adapted to be aligned with the usual elongated slot 11 provided in the license bracket B.

The bolt C which is of ordinary construction, preferably embodies a square head 12 and a shank portion 13, the shank 13 being adapted to extend through the aligned slots 10 and 11, and project outwardly past the rear face of the bracket B for threaded reception of the square nut D. While the nut D and bolt head 12 have been shown as being square, it will be understood that this is merely for convenience in illustration, and is in no wise restrictive of the application of the invention.

Referring now to the locking device F, which may be formed from a strip of metal of a suitable nature, the same has a right angularly extending flange 14 formed at one end thereof for engagement with one face of the nut D. This flange is formed relatively long, so as to permit of the lock washer E being used to keep the parts from rattling, and still permit of a substantial portion of the flange to firmly engage one face of the nut to prevent its rotation. Formed adjacent the flange 14 of the strip, is a washer like portion 15, and which portion will hereafter be referred to as an inner washer like portion. This inner washer like portion 15 is connected by a reduced portion 16 to one edge of an intermediate washer like portion 17 having a bendable tongue portion 18; and formed contiguous with the tongue portion 18, is an outer washer like portion 19 provided with a terminally disposed bendable tongue portion 20. Each of the washer like portions 15, 17 and 19, which are arranged in longitudinal alignment, are provided with bolt receiving perforations 21, 22 and 23 respectively arranged in alignment at the longitudinal center of the strip.

In Figures 1 to 3 inclusive, the strip is bent substantially midway between the perforations 21 and 23 into U-shaped formation, with the perforations 21 and 23 in aligned relation for permitting of the shank of the bolt to be readily passed therethrough. This formation permits of the U-shaped body being slipped downwardly over the upper marginal edges of the bracket and license plate, with the flange carrying leg disposed in surface contact with the rear face of the bracket, and with the relatively longer leg in surface contact with the face of the license plate. When in this position, the bendable tongue 20 may be bent outwardly about the head of the bolt for preventing relative movement of the bolt and nut.

Referring now to the adaptation of the device as shown in Figures 4 to 6 inclusive, and wherein the license supporting bracket is shown as being of such height as to prevent alignment of the perforations 21 and 23 with the aligned slots of the bracket and license plate as in a manner as illustrated in Figures 1 to 3 inclusive; the strip is bent at the reduced portion 16 into U-shaped formation, with the reduced portion extending through the aligned slots 10 and 11, and with the perforations 21 and 22 in aligned relation for permitting of the shank of the bolt to be readily passed therethrough. This reduced portion 16 is of a width substantially equal to the width of the slots 10 and 11, for permitting of the legs of the clip being extended in a line with the major axis of the slots, thereby bringing the perforations 21 and 22 into registering alignment with the slots. When used in this manner, the bendable tongue 18 may be bent about the head of the bolt for preventing relative movement of the bolt and nut, and the surplus portion of the strip severed along the weakening line 24 which divides the tongue 18 and washer like portion 19.

An offset 25 may be provided at the inner end of the flange 14, for accommodating lock washers of slightly larger dimensions than that of the nut being used, without liability of the washer holding the flange out of contact with the side of the nut.

It will be noted that the portions 15, 17 and 19, act as washers for the bolt and nut structure for permitting of ready turning of the bolt for drawing the license plate into tight engagement with the supporting bracket.

It will be apparent from the foregoing description of the invention that a novel and efficient locking clip has been provided, whereby the retaining bolts of a license plate will be prevented from working loose due to vibration, and resulting in probable loss of the license plate.

Various changes may be made as to the shape, size, and adaptation of the device, without departing from the spirit of the invention or the scope of the following claims.

I claim:

1. As an article of manufacture, a locking means for bolts and nuts, comprising a strip like member formed with a flat main body portion having a right angularly disposed flange formed at one end thereof, said main body portion comprising a plurality of washer like portions formed in contiguous longitudinal alignment, and said flange having an offset adjacent its juncture with the main body portion, substantially as and for the purpose set forth.

2. As an article of manufacture, a locking device for bolts and nuts, comprising a strip like member formed with a flat main body portion having an outwardly bent right angularly disposed flange formed at one end thereof, said main body portion comprising a plurality of washer like portions formed in contiguous longitudinal alignment, and having a reduced portion connecting two of said washer like portions.

3. As an article of manufacture, a locking device for bolts and nuts, comprising a strip like member formed with a plurality of washer like portions each embodying a tongue portion, a reduced portion connecting two of the washer like portions, and a weakening line dividing the tongue portion of one washer like portion with the next adjacent washer like portion.

4. As an article of manufacture, a locking device for bolts and nuts, comprising a strip like member formed with a flat main body portion having a right angularly bent flange portion at one end thereof, washer like portions formed on the main body portion adjacent said flange portion and connected by a reduced portion, and a tongue portion extending in contiguous longitudinal alignment from the washer portion lying remote from the flange portion.

5. As an article of manufacture, a locking device for bolts and nuts, comprising a pliable strip like member embodying a pair of washer like portions connected by a reduced portion, tongue portions at the opposite ends of each washer like portion, a third washer like portion connected in longitudinal alignment to the end of one of said tongue portions by a weakening line, and a terminally disposed tongue portion extending from said third washer like portion.

LEMAN J. ALPAUGH.